United States Patent [19]
Shapess

[11] Patent Number: 5,514,943
[45] Date of Patent: May 7, 1996

[54] MULTI-SPEED MOTOR CONTROL SYSTEM

[75] Inventor: Robert P. Shapess, Cato, N.Y.

[73] Assignee: Carrier Corporation, Syracuse, N.Y.

[21] Appl. No.: 276,365

[22] Filed: Jul. 18, 1994

[51] Int. Cl.$^6$ ........................................... H02P 1/44
[52] U.S. Cl. .................. 318/772; 318/794; 318/795
[58] Field of Search ................................ 318/749, 751,
318/752, 753, 754, 772, 774, 775, 777,
778, 781, 785, 794, 795

[56] References Cited

U.S. PATENT DOCUMENTS

| | | |
|---|---|---|
| 1,886,895 | 11/1932 | Myers . |
| 2,068,559 | 1/1937 | Michelsen . |
| 2,084,058 | 6/1937 | Lyden . |
| 2,462,184 | 2/1949 | Hathaway et al. . |
| 2,669,683 | 2/1954 | Burdett . |
| 3,153,184 | 10/1964 | Stout . |
| 3,887,854 | 6/1975 | Parks . |
| 4,066,937 | 1/1978 | Pfarrer et al. . |
| 4,388,581 | 6/1983 | Bhatnagar . |
| 4,408,150 | 10/1983 | Holston et al. . |
| 5,227,710 | 7/1993 | Lewus . |

*Primary Examiner*—Bentsu Ro

[57] ABSTRACT

A motor control system for a multi-speed electric motor electrically excited by a power source having at least two terminals. The motor controller system includes a switching device electrically connected to the terminals of the power source for alternating current flow from the power source, a first speed circuit, and a second speed circuit. The first speed circuit includes a first speed primary winding electrically connected to the switching device, a first speed secondary winding electrically connected to the first speed primary winding, a start capacitor electrically connected to the first speed secondary winding, and start relay electrically connected to the start capacitor. The second speed circuit includes a second speed primary winding which is connected to the switching device.

7 Claims, 1 Drawing Sheet

MULTI-SPEED MOTOR CONTROL SYSTEM

BACKGROUND OF THE INVENTION

1. Field of the Invention

This invention relates generally to motor control systems and specifically to motor control systems for providing adequate starting torque and facilitating motor efficiency especially in low speed.

2. Description of the Background Art

Electric motors typically include a stator, which is wound with start windings and run windings connected to the source of power. The stator windings surround a rotor which rotates a shaft to produce the motor output. Rotors are made in a number of different configurations which are well known in electric motor industry.

Conventional single phase motors commonly have a multi-speed capability and frequently are constructed in a capacitor start or a capacitor start/capacitor run configuration. In capacitor start motors, start circuits are connected in parallel with the run winding of each speed of the multi-speed motor. The start circuits include start windings which are connected in series with start capacitors. During a motor start, both the run windings and the start windings are connected across the motor power source to magnetically excite the rotor and cause rotation thereof. The start winding and start capacitor combination is used to provide the high torque required during typical start conditions. However, the capacitance necessary to start the motor is typically too large for optimal motor efficiency. Therefore, a switch is usually connected in series with the start capacitor which is used to disengage the start circuit when the motor has either reached a predetermined speed or after a predetermined time has elapsed. However, once the start circuit is disengaged the motor still does not operate at maximum efficiency.

In capacitor start/capacitor run motors, run capacitors are used in addition to the start circuits for each speed of the multi-speed motor. The run capacitors are connected in series with a secondary windings and both are connected in parallel with the run windings for each speed of the multi-speed motor. The motor windings and the run capacitors in this configuration are tuned to run at optimal efficiency as is know in the art. Thus, when the start circuits are disengaged, the motor can be designed to run at optimal efficiency. However, this configuration requires additional complexity, costs, and potential for failure of such motors.

Optimal motor efficiency is an important criteria in designing refrigeration systems. For example, certain applications of refrigeration systems require low speed motor operation at low temperature ranges where the refrigeration system has a low capacity. Low efficiency in the low speed setting of the refrigeration system causes excessive motor heat to be added to the evaporator load which in turn further reduces the system's cooling capacity. Costs and reliability also are important criteria in designing refrigeration systems.

Thus, it is desirable to have a multi-speed motor which is low cost and simple in design while providing improved efficiency at low speeds.

SUMMARY OF THE INVENTION

It is an object of the present invention to provide an improved motor control system with enhanced efficiency.

It is a further object of the present invention to provide an improved motor control system with enhanced efficiency while operating at low motor speeds.

It is yet another object of the present invention to provide an improved motor control system which is low in cost and simple in design.

These and other objects of the present invention are achieved by a motor control system for a multi-speed electric motor electrically excited by a power source having at least two terminals. The motor controller system includes a switching device electrically connected to the terminals of the power source for alternating current flow from the power source, a first speed circuit, and a second speed circuit. The switching device has first and second contacts which are used to control current flow from the power source. The first speed circuit includes a first speed primary winding electrically connected to the switching device, a first speed secondary winding electrically connected to the first speed primary winding, a start capacitor electrically connected to the first speed secondary winding, and a start relay electrically connected to the start capacitor. The second speed circuit includes a second speed primary winding which is connected to the switching device.

In one preferred embodiment according to the invention, the motor control system operates by initially engaging the first speed circuit regardless of whether high or low speed is desired for operation. During a motor start, the switching device closes its contacts to electrically excite the first speed circuit. Additionally, the start relay closes for a predetermined time. When the start relay is closed it electrically excites the start circuit.

If high speed operation is desired, the switching device holds the first speed contacts closed to allow the first speed circuit to remain active while holding the second speed contacts open to keep the second speed circuit inactive. If low speed operation is desired, then after the motor start, the switching device opens the first speed contacts to deactivate the first speed circuit while closing the second speed contacts to activate the second speed circuit. This will allow the motor to operate at low speed without the need of a second speed start circuit. Thus, during low speed operation, the motor will dissipate less heat and the system will run more efficiently.

In an alternative embodiment of the present invention, the first speed circuit further includes a first speed run capacitor. The first speed motor windings and the first speed run capacitor in this configuration are tuned to run at optimal efficiency.

In another alternative embodiment of the present invention, the second speed circuit further includes a second speed secondary winding which is electrically connected with a second speed run capacitor. Because the present invention does not require a start circuit in the second speed circuit, the second speed run capacitor can be designed for optimal run efficiency. Thus, highly efficient motor operation is accomplished without a complex, costly design.

The foregoing and other objects, features and advantages of the present invention will become more apparent in light of the following detailed description and accompanying drawings.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts, and wherein;

DETAILED DESCRIPTION OF THE PREFERRED EMBODIMENT

Figure 1:
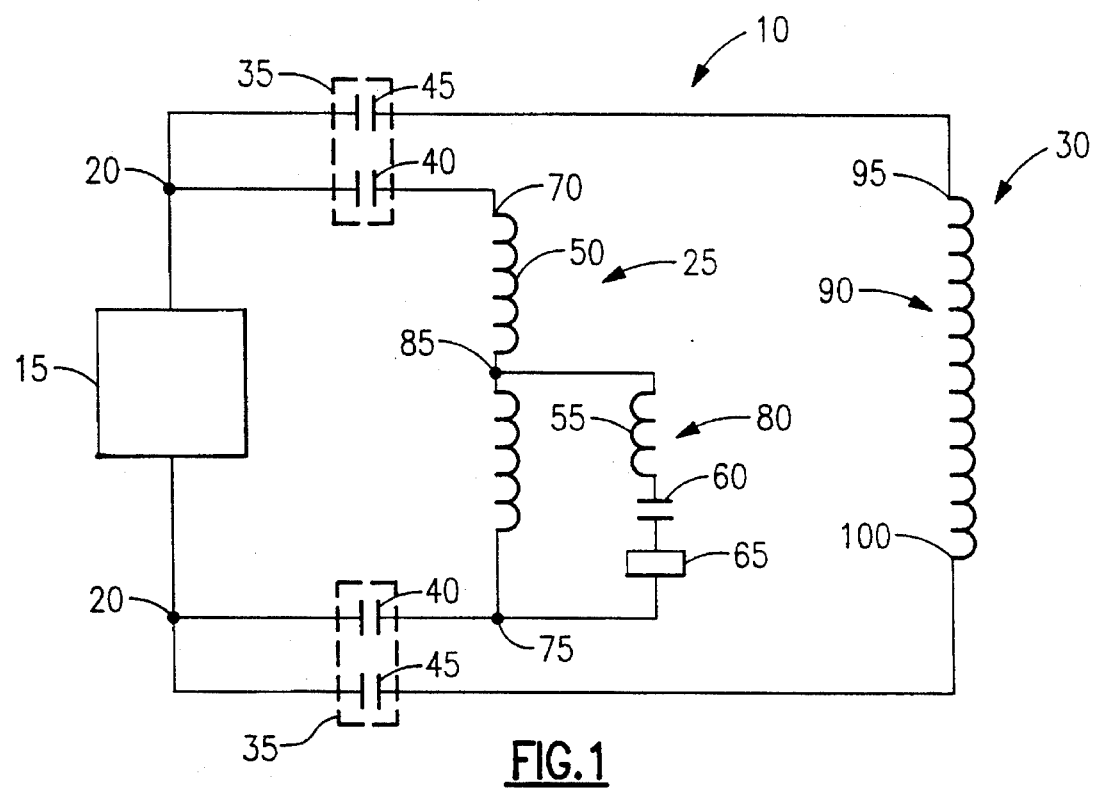
FIG. 1 and FIG. 2 circuit diagrams of preferred embodiments of motor control systems in accordance with the present invention.

In the circuit of FIG. 1, a motor control system 10 is shown. The motor control system 10 is powered by a single phase alternating current source 15 having at least two terminals 20. The motor control system 10 includes a first speed circuit 25 and a second speed circuit 30 which respectively control a first and second speed of a multi-speed electric motor. The first and second speeds may be a high and low speed respectively. Both circuits are connected to a switching device 35 which is used to control current flow to each circuit as will be explained hereinbelow.

The switching device 35 is connected to the terminals 20 of the current source 15 so as to provide electric current to the first and second speed circuits 25,30. The switching device 35 includes first and second speed contacts 40,45. The switching device 35 may be any device which is capable of manually, mechanically, or electrically opening or closing an electrical circuit as is known in the art.

The first speed circuit 25 includes a first speed primary winding 50, a first speed secondary winding 55, a start capacitor 60, and a start relay 65. The first speed primary winding 50 has first and second ends 70,75 which are connected to the first speed contacts 40 of the switching device 35. The first speed secondary winding 55, the start capacitor 60, and the start relay 65 are electrically connected in series to form a start circuit 80 which is used during a motor start as will be explained below. A motor start is the time interval between the initial activation of the motor and either a predetermined time or the time when the motor has reached a predetermined speed. The start circuit 80 may be electrically connected in parallel with the first speed primary winding 50. Alternatively, the first speed primary winding 50 may be tapped with the secondary winding 55 of the start circuit 80 electrically connected to the tap 85 of the first speed primary winding 50 (as shown in FIG. 1).

The second speed circuit 30 includes a second speed primary winding 90 having first and second ends 95,100 which are electrically connected to the second speed contacts 45 of the switching device 35.

In one preferred embodiment according to the invention, the motor control system 10 operates by initially engaging the first speed circuit 25 regardless of whether high or low speed is desired for operation. This allows the second speed circuit 30 to be designed without the constraint of having to provide the additional torque necessary during the motor start. As a result, a reduction in cost and complexity is achieved.

During the motor start, the switching device 35 closes its contacts 40 to electrically excite the first speed circuit 25. Additionally, the start relay 65, which is normally open, closes for a predetermined time. When the start relay 65 is closed it electrically excites the start circuit 80 which provides the additional torque necessary during the motor start.

If high speed operation is desired, the switching device 35 holds the first speed contacts 40 closed to allow the first speed circuit 25 to remain active while holding the second speed contacts 45 open to keep the second speed circuit 30 inactive. This will allow the motor to operate at high speed.

If low speed operation is desired, then after the motor start the switching device 35 opens the first speed contacts 40 to deactivate the first speed circuit 25 while closing the second speed contacts 45 to activate the second speed circuit 30. This will allow the motor to operate at low speed without the need of a second speed start circuit. Thus, during low speed operation, the motor will dissipate less heat and the system will run more efficiently.

Figure 2:
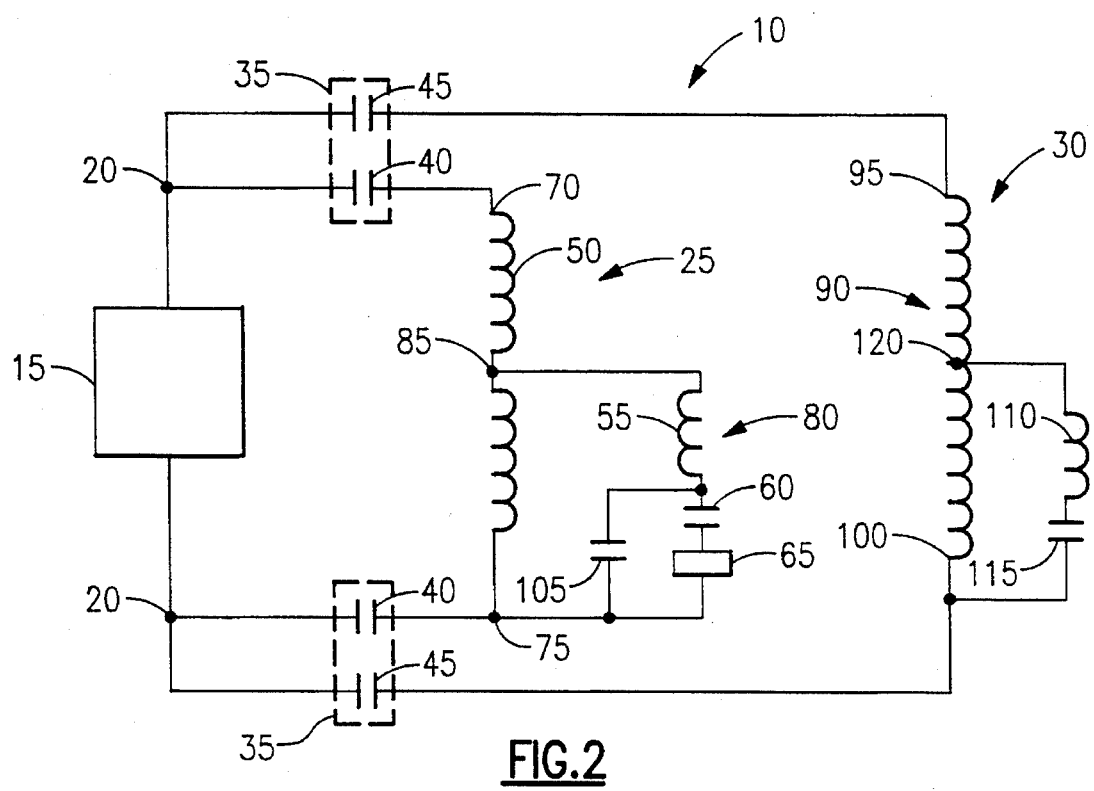

FIG. 2 shows alternative embodiments of the present invention. In one alternative embodiment, a first speed run capacitor 105 is connected in parallel across the series combination of the start capacitor 60 and the start relay 65. The first speed motor windings 50,55 and the first speed run capacitor 105 in this configuration are tuned to run at optimal efficiency as is know in the art. When the start circuit 80 is disengaged, the first speed run capacitor 105 and the first speed secondary winding 55 will remain active and the motor can be designed to run at optimal efficiency.

In another alternative embodiment of the present invention, the second speed primary winding 90 is connected to a second speed secondary winding 110 which is electrically connected in series with a second speed run capacitor 115. The series combination of the second speed secondary winding 110 and the second speed run capacitor 115 is in parallel with the second speed primary winding 90. Alternatively, the second speed primary winding 90 is tapped and the second speed secondary winding 110 is electrically connected to the tap 120 (as shown in FIG. 2). Because the present invention does not require a start circuit in the second speed circuit 30, the second speed run capacitor 115 can be designed for optimal run efficiency. Thus, highly efficient motor operation is accomplished without a complex, costly design.

Depending on the specific design needs and constraints, the abovementioned alternate embodiments may be utilized separably or together.

Although the invention has been shown and described with respect to a best mode embodiment thereof, it should be understood by those skilled in the art that various other changes, omissions and additions in the form and detail thereof may be made therein without departing from the spirit and scope of the invention.

What is claimed is:

1. A motor control system for a multi-speed electric motor electrically powered by a single phase alternating current source having at least two terminals, said motor control system comprising:

a first speed primary winding electrically connected across the terminals of the single phase alternating current source for operating the motor at a first speed, said first speed primary winding having first and second ends;

start means electrically connected to said first speed primary winding for providing the necessary torque during a motor start;

a second speed primary winding for operating the motor at a second speed different than the first speed, said second speed primary winding having first and second ends;

a switching device electrically connected to the first and second ends of said first and second speed primary windings and the terminals of the single phase alternating current source for alternating current flow between said first and second speed primary windings; and a second speed secondary winding electrically connected to said second speed primary winding and a second speed run capacitor serially connected to said second speed secondary winding.

2. A motor control system as recited in claim 1 wherein said second speed primary winding is tapped and said second speed secondary winding is electrically connected to the tap of said second speed primary winding.

3. A motor control system for a multi-speed electric motor electrically excited by a power source having at least two terminals, said motor-control system comprising:

switching device electrically connected to the terminals of the power source for alternating current flow from the power source;

a first speed circuit having a first speed primary winding electrically connected to said switching device, a first speed secondary winding electrically connected to the first speed primary winding, a start capacitor electrically connected to the first speed secondary winding, and start relay electrically connected to the start capacitor;

a second speed circuit electrically connected to said switching device, said second speed circuit having a second speed primary winding; and wherein the first speed primary winding is tapped and the first speed secondary winding is electrically connected to the tap of the first speed primary winding.

4. A motor control system for a multi-speed electric motor electrically powered by a single phase alternating current source having at least two terminals, said motor control system comprising:

a first speed primary winding electrically connected across the terminals of the single phase alternating current source for operating the motor at a first speed, said first speed primary winding having first and second ends;

start means electrically connected to said first speed primary winding for providing the necessary torque during a motor start, said start means comprising: a series combination of a secondary winding, a start capacitor, and a start relay, and further comprising a first speed run capacitor connected in parallel across the series combination of said start capacitor and said start relay;

a second speed primary winding for operating the motor at a second speed different than the first speed, said second speed primary winding having first and second ends; and a switching device electrically connected to the first and second ends of said first and second speed primary windings and the terminals of the single phase alternating current source for alternating current flow between said first and second speed primary windings.

5. A motor control system for a multi-speed electric motor electrically excited by a power source having at least two terminals, said motor control system comprising:

switching device electrically connected to the terminals of the power source for alternating current flow from the power source;

a first speed circuit having a first speed primary winding electrically connected to said switching device, a first speed secondary winding electrically connected to the first speed primary winding, a start capacitor electrically connected to the first speed secondary winding, and start relay electrically connected to the start capacitor, said first speed circuit further comprising a first speed run capacitor electrically connected in parallel across the series combination of the start capacitor and the start relay; and a second speed circuit electrically connected to said switching device, said second speed circuit having a second speed primary winding.

6. A motor control system for a multi-speed electric motor electrically excited by a power source having at least two terminals, said motor control system comprising:

a switching device electrically connected to the terminals of the power source for alternating current flow from the power source;

a first speed circuit having a first speed primary winding electrically connected to said switching device, a first speed secondary winding electrically connected to the first speed primary winding, a start capacitor electrically connected to the first speed secondary winding, and start relay electrically connected to the start capacitor; and a second speed circuit electrically connected to said switching device, said second speed circuit having a second speed primary winding, a second speed secondary winding electrically connected to the second speed primary winding, and a second speed run capacitor electrically connected in series to the second speed secondary winding.

7. A motor control system for a multi-speed electric motor electrically excited by a power source having at least two terminals, said motor control system comprising:

switching device electrically connected to the terminals of the power source for alternating current flow from the power source;

a first speed circuit having a first speed primary winding electrically connected to said switching device, a first speed secondary winding electrically connected to the first speed primary winding, a start capacitor electrically connected to the first speed secondary winding, and start relay electrically connected to the start capacitor; and a second speed circuit electrically connected to said switching device, said second speed circuit having a second speed primary winding, a second speed secondary winding electrically connected to the second speed primary winding, and a second speed run capacitor electrically connected in series to the second speed secondary winding and, further, wherein the second speed primary winding is tapped and the second speed secondary winding is electrically connected to the tap of said second speed primary winding.

* * * * *